(12) United States Patent
Suzuki et al.

(10) Patent No.: US 12,109,943 B2
(45) Date of Patent: Oct. 8, 2024

(54) ATTACHMENT STRUCTURE OF LIGHTING DEVICE

(71) Applicant: TS TECH CO., LTD., Asaka (JP)

(72) Inventors: Masanori Suzuki, Nasukarasuyama (JP); Yuichiro Hoshi, Tochigi-ken (JP); Noriyuki Yamato, Utsunomiya (JP)

(73) Assignee: TS Tech Co., Ltd., Asaka-shl (JP)

( * ) Notice: Subject to any disclaimer, the term of this patent is extended or adjusted under 35 U.S.C. 154(b) by 0 days.

(21) Appl. No.: 17/343,170

(22) Filed: Jun. 9, 2021

(65) Prior Publication Data

US 2021/0291729 A1    Sep. 23, 2021

Related U.S. Application Data

(63) Continuation of application No. 16/391,899, filed on Apr. 23, 2019, now Pat. No. 11,059,419, which is a
(Continued)

(30) Foreign Application Priority Data

| Mar. 8, 2012 | (JP) | ................................ 2012-051564 |
| Mar. 8, 2012 | (JP) | ................................ 2012-051565 |

(51) Int. Cl.
  *B60Q 3/217*    (2017.01)
  *B60Q 3/225*    (2017.01)
  *B60Q 3/51*    (2017.01)

(52) U.S. Cl.
  CPC .............. *B60Q 3/51* (2017.02); *B60Q 3/217* (2017.02); *B60Q 3/225* (2017.02)

(58) Field of Classification Search
  CPC ... F21S 8/02; F21S 8/024; F21S 8/026; B60Q 3/20; B60Q 3/217; B60Q 3/225;
  (Continued)

(56) References Cited

U.S. PATENT DOCUMENTS

| 4,646,210 A | 2/1987 | Skogler et al. |
| 5,036,436 A | 7/1991 | Rattigan et al. |
(Continued)

FOREIGN PATENT DOCUMENTS

| CN | 101540464 A | 9/2009 |
| GB | 2475940 A | 6/2011 |
(Continued)

OTHER PUBLICATIONS

Machine translation of JP-2009143505-A, retrieved from worldwide.espacenet.com on Aug. 29, 2023 (Year: 2023).*
(Continued)

*Primary Examiner* — Abdulmajeed Aziz
*Assistant Examiner* — Steven Y Horikoshi
(74) *Attorney, Agent, or Firm* — Carrier, Shende & Associates P.C.; Joseph P. Carrier; Jeffrey T. Gedeon (57) ABSTRACT

An attachment structure for installing a lighting device on an attachment target, includes a hole formed in a bottom surface of the attachment structure for letting light from the lighting device pass through the hole, and a plurality of ribs formed around the hole. The plurality of ribs are substantially flush with each other in a lighting device placement area configured to receive a bottom surface of the lighting device, so that the lighting device is positioned with respect to the bottom surface of the attachment structure in a height direction of the lighting device.

6 Claims, 10 Drawing Sheets

Related U.S. Application Data continuation of application No. 16/042,656, filed on Jul. 23, 2018, now Pat. No. 10,315,562, which is a continuation of application No. 14/382,940, filed as application No. PCT/JP2013/053625 on Feb. 15, 2013, now Pat. No. 10,065,559.

(58) Field of Classification Search
CPC . B60Q 3/267; B60Q 3/50; B60Q 3/51; B60Q 3/54; B60Q 3/57; H01R 13/74–745; F21V 19/003; F21V 19/004; F21K 9/20
See application file for complete search history.

(56) References Cited

U.S. PATENT DOCUMENTS

| | | | |
|---|---|---|---|
| 6,152,590 | A | 11/2000 | Furst et al. |
| 7,717,746 | B2 | 5/2010 | Nagai et al. |
| 11,059,419 | B2 * | 7/2021 | Suzuki ............... B60Q 3/217 |
| 2001/0006465 | A1 * | 7/2001 | Misawa ............. B60Q 3/267 |
| | | | 362/399 |
| 2004/0252514 | A1 | 12/2004 | Okabe et al. |
| 2008/0011930 | A1 * | 1/2008 | Nagai ................. B60Q 3/51 |
| | | | 248/503 |
| 2008/0198607 | A1 | 8/2008 | Goto |
| 2009/0129100 | A1 | 5/2009 | Goto et al. |
| 2010/0195348 | A1 | 8/2010 | Ohtsuka et al. |
| 2010/0208482 | A1 | 8/2010 | Ohtsuka et al. |
| 2010/0226140 | A1 | 9/2010 | Mochizuki |
| 2011/0222306 | A1 * | 9/2011 | Nagai .................. B60Q 3/51 |
| | | | 362/546 |

FOREIGN PATENT DOCUMENTS

| | | | |
|---|---|---|---|
| JP | 2000-048606 A | | 2/2000 |
| JP | 2002-036950 A | | 2/2002 |
| JP | 2003-291722 A | | 10/2003 |
| JP | 2005-324607 A | | 11/2005 |
| JP | 3840862 B2 | | 11/2006 |
| JP | 2007-314073 A | | 12/2007 |
| JP | 2009143505 A | * | 7/2009 |
| JP | 2009-245681 A | | 10/2009 |
| JP | 2009-286207 A | | 12/2009 |
| JP | 2010-086751 A | | 4/2010 |
| JP | 2010-100127 A | | 5/2010 |
| JP | 2010-143444 A | | 7/2010 |
| JP | 2010-232154 A | | 10/2010 |
| JP | 2011-116315 A | | 6/2011 |
| JP | 2011-240811 A | | 12/2011 |
| WO | 2010/009067 A2 | | 1/2010 |

OTHER PUBLICATIONS

PCT/ISA/210, with the English translation thereof, from International application PCT/JP2013/053625.

* cited by examiner

ATTACHMENT STRUCTURE OF LIGHTING DEVICE

CROSS-REFERENCE TO RELATED APPLICATIONS

The present application is a continuation of prior U.S. patent application Ser. No. 16/391,899, filed Apr. 23, 2019, which is a continuation of prior U.S. patent application Ser. No. 16/042,656, filed Jul. 23, 2018, which is a continuation of prior U.S. patent application Ser. No. 14/382,940, filed Sep. 4, 2014, which is the US National Phase of International Application PCT/JP2013/053625 filed Feb. 15, 2013, which is based on Japanese Patent Application Nos. 2012-051565 and 2012-051564, both filed Mar. 8, 2012. The entire disclosures of all of these priority applications are incorporated by reference herein.

TECHNICAL FIELD

The present invention relates to an attachment structure for a lighting device, and more particularly to an attachment structure suitable for installing a lighting device on an interior member of a vehicle that serves as an attachment target on which the lighting device is to be installed.

BACKGROUND ART

Lighting devices for use in vehicles are installed on an interior member of a vehicle as follows: After a lighting device has been fixed to an attachment structure, the attachment structure is placed to engage in holes, etc. defined in the interior member of the vehicle. Japanese Patent No. 3840862 discloses that an LED (Light-Emitting Diode) light source as a lighting device is fixed to a casing that serves as an attachment structure, and the feet of the casing are placed to engage in holes defined in an inside handle bezel, so that the LED light source and the casing are installed on the inside handle bezel that serves as an attachment target.

A lighting device for use in vehicles is installed on an interior member of a vehicle by teeth on a light source of the lighting device which engage in holes, etc. defined in the interior member of the vehicle. Japanese Laid-Open Patent Publication No. 2009-245681 discloses a lighting device including an LED lamp serving as a light source and a connector for supplying electric power to the LED lamp, the light source having teeth on side surfaces thereof.

SUMMARY OF INVENTION

According to the technology disclosed in Japanese Patent No. 3840862, however, since the casing and the inside handle bezel are not integral with each other, the number of parts used is large. The number of man-hours for assembling the lighting device is also large because the assembling process requires the step of attaching the LED light source to the casing and the step of assembling the case with the LED light source attached thereto on the inside handle bezel.

A connector is connected to a wire harness in a vehicle so that the connector can be supplied with electric power from a battery or the like. Therefore, the connector tends to be subjected to vibrations and loads from the wire harness. According to the technology disclosed in Japanese Laid-Open Patent Publication No. 2009-245681, however, as an attachment structure is not designed to support the connector, the lighting device that includes the connector cannot stably be supported when the connector is subjected to vibrations and loads from the wire harness.

It is a first object of the present invention to provide an attachment structure which is of a simple structure capable of installing a lighting device on an attachment target.

A second object of the present invention is to provide an attachment structure that is capable of stably supporting a lighting device that includes a connector.

In order to achieve the first object, there is provided in accordance with the present invention an attachment structure for installing a lighting device on an attachment target, comprising a rest disposed on a surface of the attachment target and configured to place the lighting device thereon, and a mounting member configured to fix the lighting device placed on the rest, wherein the attachment structure is integral with the attachment target (first feature).

The rest should preferably be arranged as an attachment angle changer configured to adjust an attachment angle at which the lighting device is installed on the attachment target (second feature).

Specifically, the rest should preferably be arranged as a height adjuster configured to keep a placement surface of the rest for the lighting device substantially horizontal by adjusting a height of the rest depending on a state of the surface of the attachment target (third feature).

The height adjuster may comprise a plurality of ribs rising from the surface of the attachment target (fourth feature).

The mounting member should preferably have an engaging member configured to engage the lighting device, and at least one of the ribs should preferably be joined to the mounting member (fifth feature).

When the lighting device is placed on the rest so that an attachment surface of the lighting device faces a placement surface of the rest, the lighting device should preferably have side surfaces extending from the attachment surface so as to be spaced from the placement surface, and when the mounting member faces one of the side surfaces of the lighting device, an opening should preferably be defined in a location which faces the mounting member and which faces another of the side surfaces of the lighting device (sixth feature).

The engaging member should preferably comprise a hook configured to engage one of the side surfaces of the lighting device and a surface, which is opposite to the attachment surface, of the lighting device (seventh feature).

In order to achieve the second object, there is also provided in accordance with the present invention an attachment structure for installing a lighting device on an attachment target, wherein the lighting device comprises a light source unit configured to output illumination light and a connector configured to supply electric power to the light source unit, and the attachment structure has at least a connector support configured to install and support the connector on the attachment target (eighth feature).

The attachment structure should preferably further include a light source support configured to install and support the light source unit on the attachment target (ninth feature).

When the lighting device is placed on the attachment target so that an attachment surface of the lighting device faces a surface of the attachment target, the lighting device has side surfaces extending from the attachment surface so as to be spaced from the surface of the attachment target, the light source support supports a side surface of the light source unit that makes up part of one of the side surfaces of the lighting device, and the connector support supports a side surface of the connector which makes up part of one of the side surfaces of the lighting device (tenth feature).

The light source unit and the connector of the lighting device should preferably be joined along the surface of the attachment target, and at least a portion of the connector on one of the side surfaces of the lighting device should preferably be supported by the connector support, and a portion of the light source unit on another one of the side surfaces of the lighting device should preferably be supported by the light source support (eleventh feature).

The attachment structure should preferably further include a position limiter configured to limit displacement of the lighting device in a direction along the surface of the attachment target (twelfth feature).

The position limiter may comprise a wall held in contact with the side surface of the lighting device and/or a portion of the connector support and a portion of the light source support (thirteenth feature).

The position limiter should preferably be integrally formed with the light source support and the connector support (fourteenth feature).

When the connector support or the light source support faces one of the side surfaces of the lighting device, an opening should preferably be defined in a location which faces the connector support or the light source support and which faces another of the side surfaces of the lighting device (fifteenth feature).

The attachment structure should preferably further include an illumination hole configured to pass therethrough the illumination light output from the light source unit, and the opening and the illumination hole should preferably be disposed in respective positions which are spaced from each other (sixteenth feature).

The attachment target should preferably comprise an interior member of a vehicle, and the illumination hole should preferably be of a shape that is elongate along a longitudinal direction of the lighting device, and be positionally displaced from the light source unit outwardly of a passenger compartment of the vehicle (seventeenth feature).

At least one of the connector support and the light source support should preferably have an engaging member configured to engage the lighting device (eighteenth feature).

The engaging member of the connector support comprises a hook configured to engage a side surface of the connector and a surface, which is opposite to the attachment surface, of the connector, and the engaging member of the light source support comprises an engaging hole configured to engage a ledge on a side surface of the light source unit or a recess configured to house the ledge therein (nineteenth feature).

The attachment target comprises an interior member of a vehicle, and the engaging hole is positioned outwardly of the passenger compartment in the attachment structure (twentieth feature).

Another rib supporting the mounting member or the position limiter should preferably be joined to the mounting member or the position limiter (twenty-first feature). An upper component may be mounted on the attachment target by an upper component mount above the lighting device and the attachment structure in the attachment target, and the lighting device and the attachment structure, and the upper component mount may be staggered in mutually different positions along longitudinal directions of the attachment target and disposed on the attachment target (twenty-second feature).

According to the first feature of the invention, since the attachment structure and the attachment target are integral with each other, the process of installing the lighting device on the attachment target is completed by placing the lighting device on the rest of the attachment structure and supporting and fixing the lighting device with the mounting member. As a result, the number of parts used and the number of man-hours for installing the lighting device are reduced compared with the technology disclosed in Japanese Patent No. 3840862, making it possible to install the lighting device on the attachment target with a simpler arrangement. The rigidity of the attachment structure is increased as the attachment structure and the attachment target are integral with each other.

According to the second feature of the invention, the rest functions as an attachment angle changer for adjusting an attachment angle at which the lighting device is installed on the attachment target. By adjusting the attachment angle, it is possible to set the illumination angle of the illumination light output from the lighting device to a desired angle.

According to the third feature of the invention, the rest functions as a height adjuster for keeping a placement surface for the lighting device substantially horizontal. The attachment angle at which the lighting device is installed on the attachment target can easily be changed by adjusting the height of the rest depending on the state of the surface of the attachment target. As a result, while the illumination angle of the illumination light output from the lighting device is set to a desired angle, it is possible to install the lighting device on the rest while the placement surface is kept substantially horizontal.

According to the fourth feature of the invention, the height adjuster comprises a plurality of ribs rising from the surface of the attachment target. As the ribs are integral with the attachment target, the number of parts used is reduced, and at the same time the rigidity of the attachment structure is increased.

According to the fifth feature of the invention, at least one of the ribs is joined to the mounting member. The rigidity of the mounting member can be increased while the illumination angle of the illumination light output from the lighting device is set to a desired angle. An engaging member on the mounting member engages the lighting device, thereby stably supporting the lighting device.

According to the sixth feature of the invention, an opening is defined in facing relation to the mounting member. When the attachment structure is molded using a die assembly, at least a portion of the attachment structure which is lower than the engaging member may be molded by a lower die, whereas a portion of the attachment structure which is higher than the lower end may be molded by an upper die. Preferably, the lower die has an extension extending through the opening to the mounting member. After the attachment structure is molded using the die assembly, the lower die is slid in the direction from the mounting member toward the opening. Therefore, the lower die can easily be removed. When the upper die is removed upwardly, the attachment structure molded to desired shape is obtained.

According to the seventh feature of the invention, as the hook engages the lighting device, greater rigidity is achieved than if the hook engages in a hole. The lighting device can thus be stably supported.

According to the eighth feature of the invention, when the lighting device is installed on the attachment target by the attachment structure, the connector of the lighting device is supported by the connector support. Therefore, even if vibrations and loads are applied from a wire harness to the connector, the connector is stably supported. The lighting device that includes the connector is thus stably supported.

According to the ninth feature of the invention, the light source unit is supported by the light source support, and the connector is supported by the connector support. The lighting device is thus stably supported.

According to the tenth feature of the invention, the light source support supports a side surface of the light source unit and the connector support supports a side surface of the connector. The lighting device is thus stably supported.

According to the eleventh feature of the invention, at least one of the side surfaces of the lighting device is supported by the connector support, and another one of the side surfaces of the lighting device is supported by the light source support. The two supports support the two side surfaces, respectively, of the lighting device in facing relation to each other. As a consequence, the lighting device is easily and stably supported.

According to the twelfth feature of the invention, the lighting device is prevented from being displaced in a direction along the surface of the attachment target, i.e., in the lateral directions thereof. As a consequence, the lighting device is stably supported.

According to the thirteenth feature of the invention, a wall held in contact with the side surfaces of the lighting device and/or portions of the connector support and the light source support serve as the position limiter. The position limiter is thus easily capable of limiting the position of the lighting device.

According to the fourteenth feature of the invention, the position limiter, the light source support, and the connector support are integrally formed with each other. Therefore, the position limiter, the light source support, and the connector support are of increased rigidity, making it possible to support the lighting device stably.

According to the fifteenth feature of the invention, an opening is defined in facing relation to the connector support or the light source support. If the connector support or the light source support has an engaging member for engaging the light source, then when the attachment structure is molded using a die assembly, at least a portion of the attachment structure which is lower than the lower end of the engaging member may be molded by a lower die, whereas a portion of the attachment structure which is higher than the lower end may be molded by an upper die. Preferably, the lower die has an extension extending through the opening to the connector support or the light source support. After the attachment structure is molded using the die assembly, the lower die is slid in the direction from the connector support or the light source support toward the opening. Therefore, the lower die can easily be removed. When the upper die is removed upwardly, the attachment structure molded to desired shape is obtained.

According to the sixteenth feature of the invention, the opening and the illumination hole are positionally displaced from each other, thereby preventing the attachment structure from being reduced in rigidity at one location due to the opening.

According to the seventeenth feature of the invention, the illumination hole is defined in the outward direction of the vehicle, i.e., in the direction away from the occupants of the vehicle, so that the length of the illumination hole along the longitudinal directions of the lighting device can be increased in the outward direction of the vehicle away from the occupants of the vehicle.

According to the eighteenth feature of the invention, at least one of the connector support and the light source support has an engaging member. The engaging member and the lighting device can be held in engagement with each other while the lighting device is supported. As a result, the lighting device is stably supported.

According to the nineteenth feature of the invention, the hook engages the connector which tends to be subjected to vibrations and loads from the wire harness. Therefore, the connector is stably supported with greater rigidity than if the hook engages in a hole. The ledge of the light source unit which is less liable to be subjected to vibrations and loads from the wire harness engages in the engaging hole or and the recess, thereby stably supporting the light source unit.

According to the twentieth feature of the invention, the engaging hole is positioned outwardly of the passenger compartment in the attachment structure. When the lighting device is to be installed on an interior member before the interior member is mounted in the vehicle, the engaging hole is positioned at a location that can easily be visually recognized by the worker. The worker is thus capable of easily confirming whether the ledge of the light source unit is engaging in the engaging hole or not.

According to the twenty-first feature of the invention, another rib is joined to the mounting member or the position limiter and supports the mounting member or the position limiter. The rigidity of the attachment structure is thus increased.

According to the twenty-second feature of the invention, the lighting device and the attachment structure, and an upper component mount are staggered in mutually different positions along the longitudinal directions of the attachment target and disposed on the attachment target. When the upper component is removed from the attachment target, the lighting device and the attachment structure are prevented from getting in the way.

DESCRIPTION OF EMBODIMENTS

An attachment structure for a lighting device according to a preferred embodiment of the present invention will be described in detail below with reference to the accompanying drawings.

Figure 1:
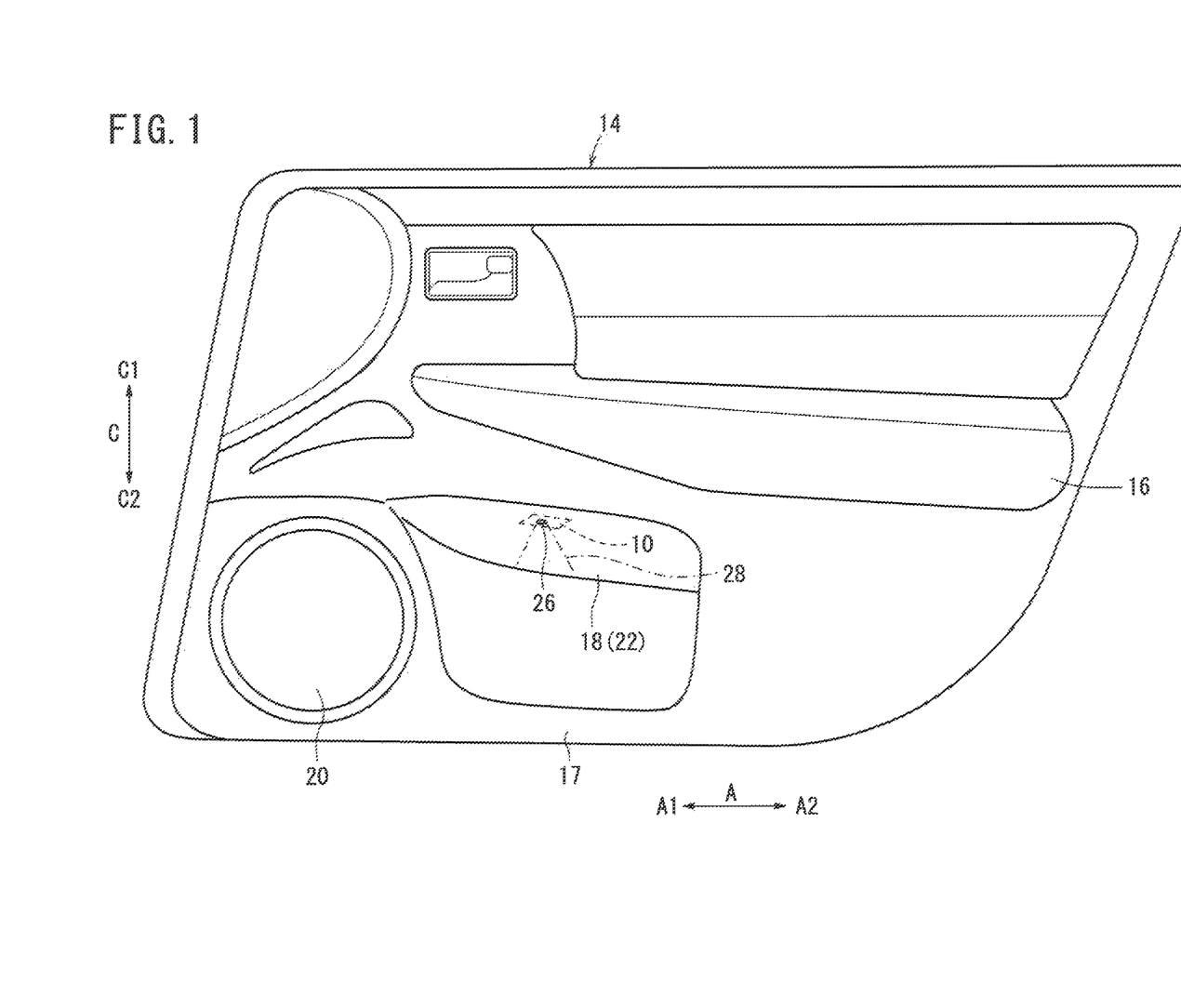
FIG. 1 is a perspective view of a door lining that incorporates an attachment structure for a lighting device according to an embodiment of the present invention.
Figure 2:
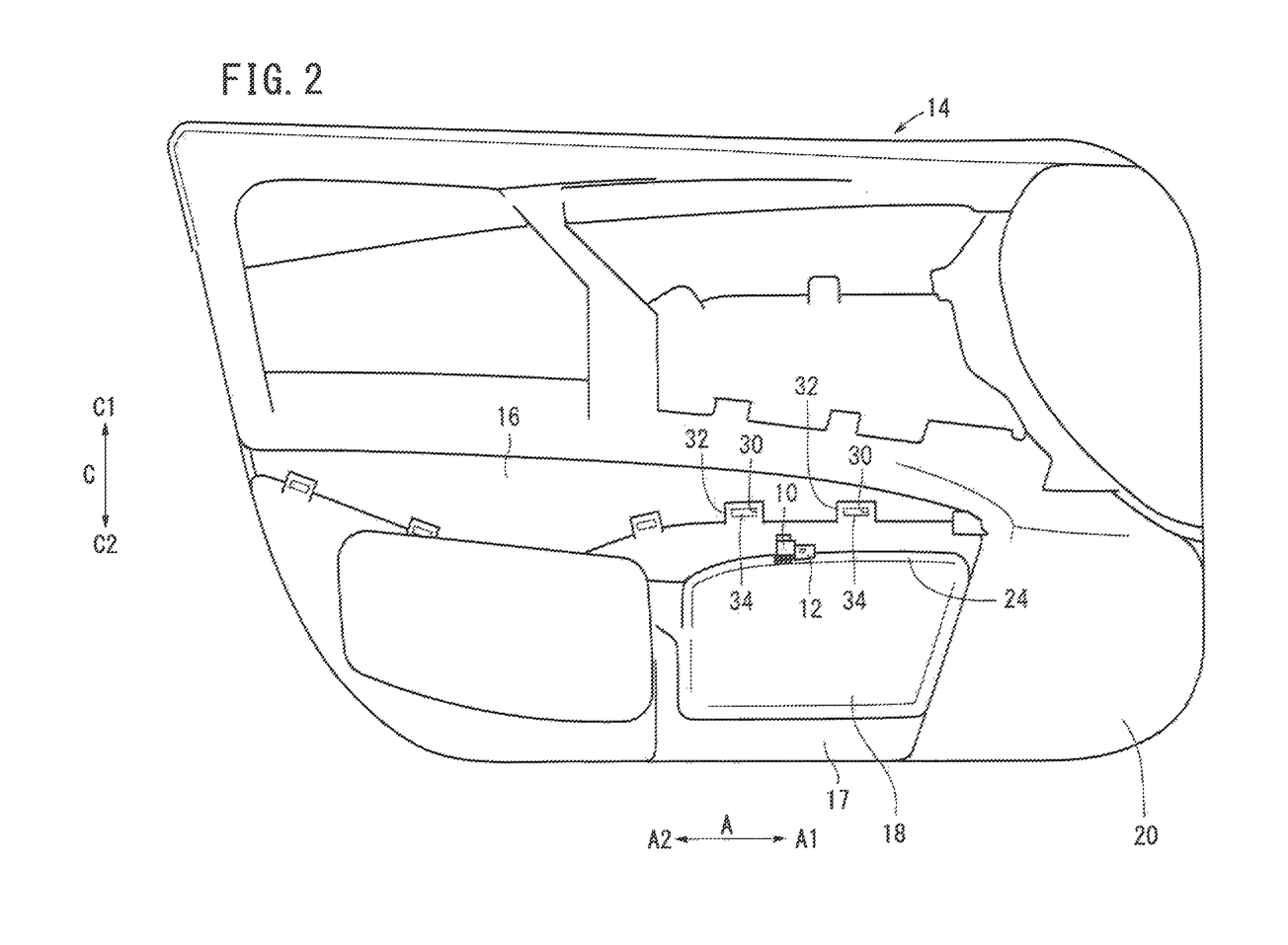
FIG. 2 is a perspective view of a back surface of the door lining shown in FIG. 1.

An attachment structure 12 for a lighting device 10 according to the present embodiment is applied to a door lining (door trim) 14 which is to be attached to an inner side (facing the passenger compartment) of a door panel of a vehicle as shown in FIGS. 1 and 2, for example. However, the attachment structure 12 according to the present embodiment is not limited to the embodiment, but may be used to install the lighting device 10 on an attachment target such as an interior member of the vehicle other than the door lining 14 or an object other than the interior member. In the description that follows, the lighting device 10 is installed on the door lining 14 by the attachment structure 12.

A door arm rest (upper component) 16 that extends along the longitudinal directions (the directions indicated by the arrow A) of the vehicle is disposed in a central region of the door lining 14 which may be made of plastics or the like. The door lining 14 has in its lower region a lower member 17 including a door pocket 18 for accommodating articles therein and a speaker housing 20 for housing a speaker. The door pocket 18 is made partly concave to provide a cavity 22 for accommodating articles therein.

On a reverse side (outside of the passenger compartment) of the door lining 14 shown in FIG. 2, the lighting device 10 is installed by the attachment structure 12 on an upper surface 24 of the door pocket 18 that defines the cavity 22. The upper surface 24 has an illumination hole 26 (see FIG. 1) defined therein in alignment with the lighting device 10. The lighting device 10 emits illumination light 28 into the cavity 22 through the illumination hole 26.

Figure 3:
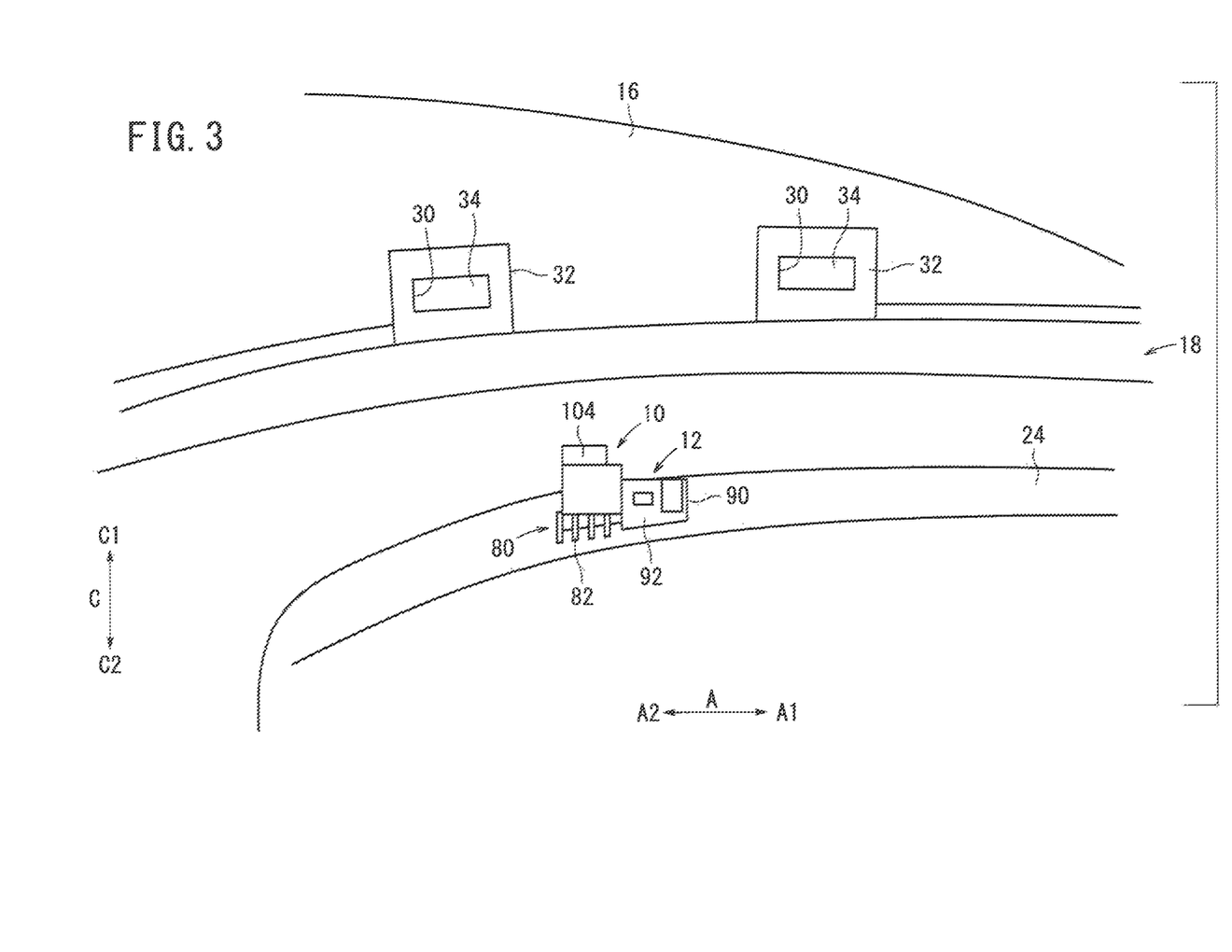
FIG. 3 is a perspective view showing at an enlarged scale an upper surface side of a door pocket shown in FIG. 2.

As shown in FIGS. 2 and 3, the lower member 17 has on its upper end a plurality of mounts (upper component mounts) 32 having respective mount holes 30 on the reverse side of the door lining 14. The lower member 17 is mounted on the door arm rest 16 by the mounts 32 that engage a plurality of teeth 34 on a lower end of the door arm rest 16. The mounts 32, the lighting device 10, and the attachment structure 12 are disposed in positions that are shifted along the directions indicated by the arrow A. As a result, the lighting device 10 and the attachment structure 12 do not lie in the way when the lower member 17 is installed on and detached from the door arm rest 16. Structural details of the door lining 14 other than the door arm rest 16 and the door pocket 18 are essentially the same as the structural details of known door linings, and will not be described in detail below.

The lighting device 10 and the attachment structure 12 will be described in greater detail below with reference to FIGS. 4 through 8.

Figure 4:
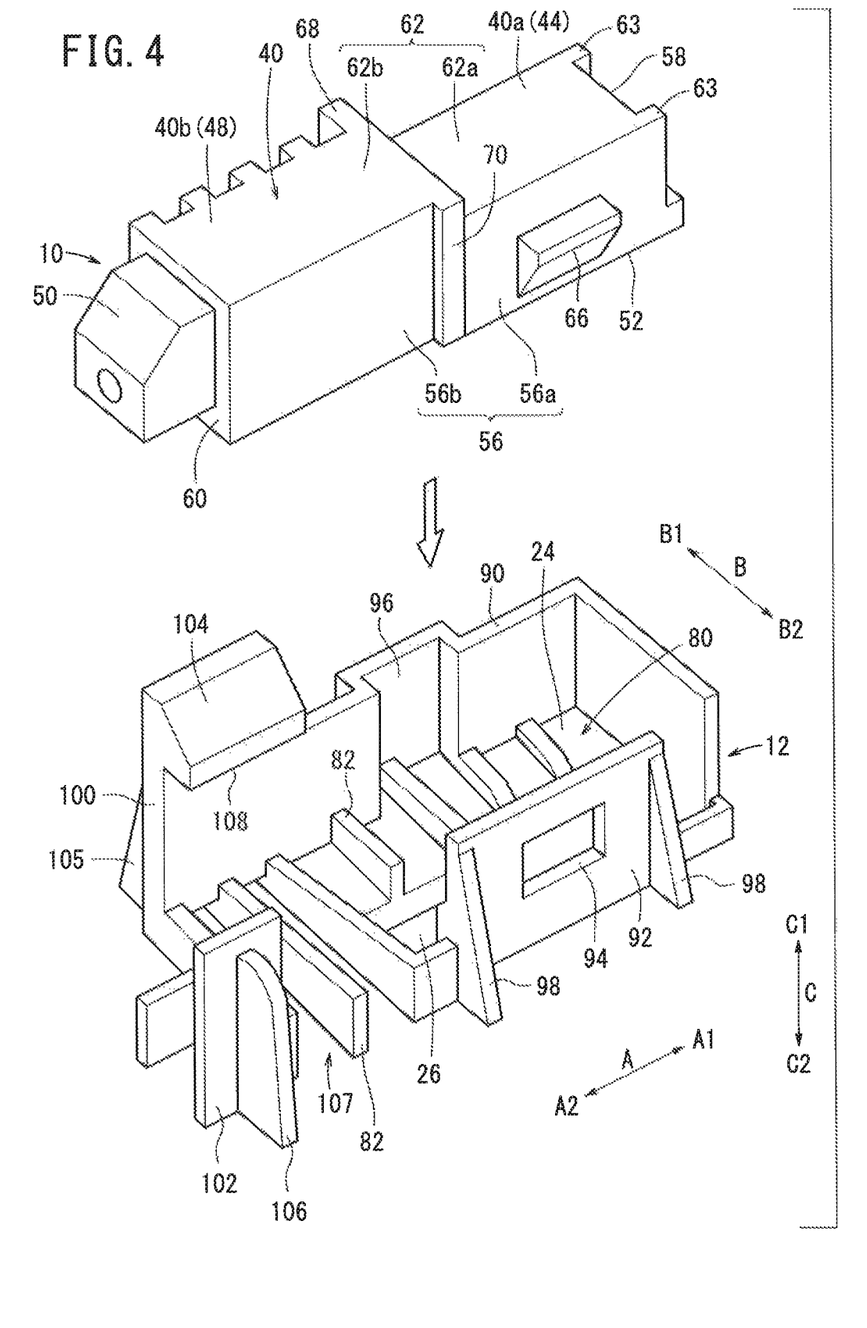
FIG. 4 is a perspective view showing the manner in which a lighting device is installed on the attachment structure according to the present embodiment.

The lighting device 10 has a substantially rectangular casing 40, and comprises a light source unit 44 having a light source 42 for emitting illumination light 28 and a connector 48 coupled to the light source unit 44 and adapted to be connected to a wire harness 46 in the vehicle. The rectangular casing 40 comprises a comparatively small first block 40*a* on one end portion and a comparatively large second block 40*b* on the other end portion. The light source unit 44 is provided in the first block 40*a*, and the connector 48 is provided in the second block 40*b*.

According to the present embodiment, the lighting device 10 is installed on the upper surface 24 of the door pocket 18 by the attachment structure 12 with the first block 40*a* being oriented in the direction indicated by the arrow A1, which indicates the forward side of the vehicle, and the second block 40*b* being oriented in the direction indicated by the arrow A2, which indicates the rearward side of the vehicle.

The light source 42 may comprise a known LED or organic EL (ElectroLuminescence) light source. The connector 48 has a connection terminal 50 for connection to the wire harness 46, and can energize the light source 42 when supplied with electric power from a battery, not shown, on the vehicle through the wire harness 46.

The casing 40 has a bottom surface 52 as an attachment surface to be mounted on the upper surface 24 of the door pocket 18, four side surfaces 54 through 60 extending upwardly from the bottom surface 52, and an upper surface 62 opposite to the bottom surface 52. The bottom surface 52 lies substantially flatwise. The side surfaces 54, 56 lie substantially perpendicularly to the directions indicated by the arrow B, which indicates transverse directions of the vehicle. The side surface 54 faces in the direction indicated by the arrow B1 which is oriented toward the passenger compartment, whereas the side surface 56 faces in the direction indicated by the arrow B2 which is oriented away from the passenger compartment. The side surface 58 faces in the direction indicated by the arrow A1, whereas the side surface 60 faces in the direction indicated by the arrow A2.

As described above, the first block 40*a* and the second block 40*b* are of different sizes, and the bottom surface 52 of the casing 40 lies substantially flatwise. The second block 40*b* bulges in the upward direction indicated by the arrow C1 and in the transverse directions indicated by the arrow B, compared with the first block 40*a*. The side surface 54 is made up of a side surface 54*a* of the first block 40*a* and a side surface 54*b* of the second block 40*b*. The side surface 56 is made up of a side surface 56*a* of the first block 40*a* and a side surface 56*b* of the second block 40*b*. The upper surface 62 is made up of an upper surface 62*a* of the first block 40*a* and an upper surface 62*b* of the second block 40*b*.

The first block 40*a*, which includes the light source unit 44, has two bar-shaped ridges 63 extending from the side surface 58 in the direction indicated by the arrow A1, a ledge 64 extending from the side surface 54*a* in the direction indicated by the arrow B1, and a ledge 66 extending from the side surface 56*a* in the direction indicated by the arrow B2, the ledge 66 being identical in shape to the ledge 64.

The second block 40*b*, which includes the connector 48, has a bar-shaped ridge 68 extending from a portion of the side surface 54*b* near the first block 40*a* in the direction indicated by the arrow B1, and a bar-shaped ridge 70 extending from a portion of the side surface 56*b* near the first block 40*a* in the direction indicated by the arrow B2, the ridge 70 being identical in shape to the ridge 68.

For use with the lighting device 10 thus constructed, the attachment structure 12 according to the present embodiment is molded of a resin integrally with the upper surface 24 of the door pocket 18 by a die assembly 120 (see FIGS. 9 and 10) to be described later, for example.

As described above, since the light source 42 is required to emit illumination light 28 through the illumination hole 26 into the cavity 22 of the door pocket 18, the attachment structure 12 is disposed in surrounding relation to the illumination hole 26 in the upper surface 24.

Specifically, the attachment structure 12 has a rest 80 for placing the bottom surface 52 of the lighting device 10 thereon. The rest 80 comprises a plurality of ribs 82 standing upwardly from the upper surface 24 in the direction indicated by the arrow C1.

Figure 8:
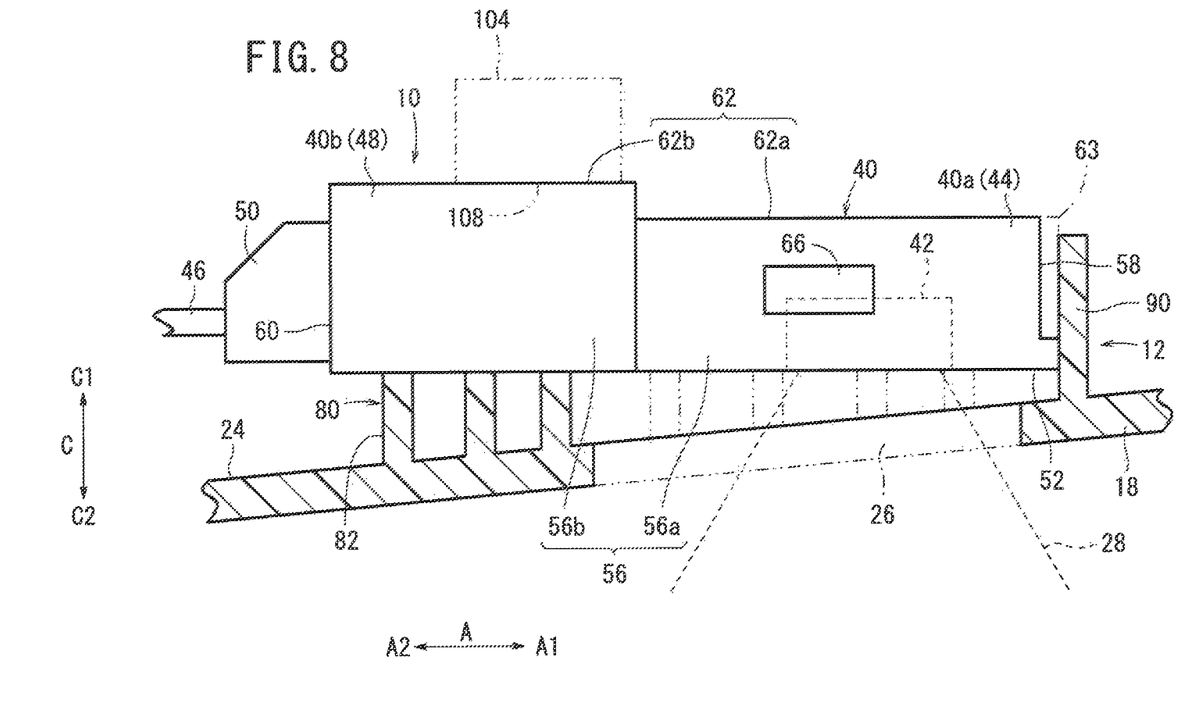
FIG. 8 is a cross-sectional view taken along line VIII-VIII of FIG. 6.

As shown in FIGS. 2, 3, and 8, the upper surface 24 is of a curved shape that is inclined downwardly along the direction indicated by the arrow A2.

According to the present embodiment, in order to install the lighting device 10 at a desired attachment angle on the upper surface 24, the heights of the ribs 82 are adjusted depending on the shape of the upper surface 24 thereby to keep the respective upper ends of the ribs 82 lying substantially flush with each other. In this manner, the rest 80 has a substantially flat placement surface for the lighting device 10. As the placement surface is made flat by adjusting the heights of the ribs 82, the lighting device 10 can be placed on the rest 80, and the angle at which the lighting device 10 is installed on the upper surface 24 can be adjusted to a desired angle.

FIGS. 3 and 8 illustrate that the respective upper ends of the ribs 82 are adjusted to the same height along the horizontal directions indicated by the arrow A, keeping the placement surface of the rest 80 substantially horizontal. According to the present embodiment, as described above, the respective upper ends of the ribs 82 are adjusted to adjust the placement surface to a desired attachment angle. The respective upper ends of the ribs 82 may be adjusted to incline the placement surface at a certain angle to the directions indicated by the arrow A, for example.

Figure 7:
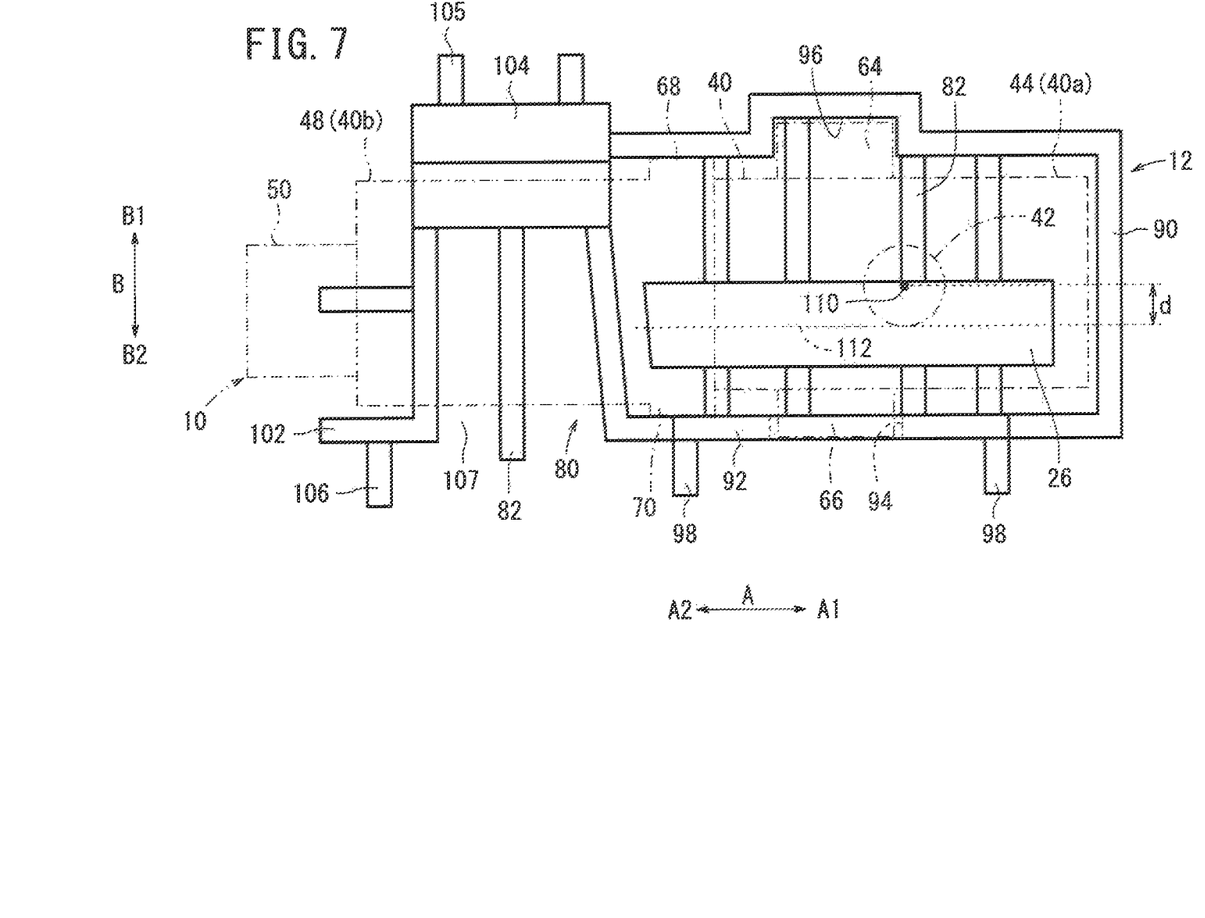
FIG. 7 is a plan view showing the attachment structure shown in FIG. 4.

As shown in plan in FIG. 7, the ribs 82 extend along the directions indicated by the arrow B around the illumination hole 26, which is of a substantially rectangular shape, extending along the directions indicated by the arrow A. Those ribs 82 that are positioned in the direction indicated by the arrow A2 away from the illumination hole 26 are comparatively long, whereas those ribs 82 that are positioned in the direction indicated by the arrow A1 adjacently to the illumination hole 26 are comparatively short.

The ribs 82 are surrounded by various mounting members that support the side surfaces 54 through 60 of the casing 40, thereby securing the lighting device 10 placed on the rest 80. These mounting members rise upwardly from the upper surface 24 along the direction indicated by the arrow C1, are integral with the upper surface 24, and can be joined to the ribs 82.

Specifically, a substantially L-shaped wall 90 that supports the side surfaces 54a, 58 and a wall-like light source support 92 that supports the side surface 56a rise from the upper surface 24 as mounting members for the first block 40a. A side of the wall 90 that projects in the direction indicated by the arrow B2 and a side of the light source support 92 that projects in the direction indicated by the arrow A1 are joined to each other. The light source support 92 has a hole 94 defined therein for engaging the ledge 66. The wall 90 has a recess 96 that is concave in the direction indicated by the arrow B1 for accommodating the ledge 64 therein.

The comparatively short ribs 82 that are positioned adjacently to the illumination hole 26 are joined to the wall 90 in the direction indicated by the arrow B1. Also, the comparatively short ribs 82 that are positioned adjacently to the illumination hole 26 and the comparatively long ribs 82 that are positioned away from the illumination hole 26 are joined to the light source support 92. The light source support 92 is supported by other ribs 98 that extend in the direction indicated by the arrow B2.

A portion of the wall 90, a wall-like connector support 100 joined to the wall 90 and supporting the side surface 54b, and a wall 102 that supports a portion of the side surface 56b rise from the upper surface 24 as mounting members for the second block 40b.

On an upper end of the connector support 100, a hook 104 is provided so that the hook 104 engages the side surface 54b and the upper surface 62b of the second block 40b. The comparatively long ribs 82 that are positioned away from the illumination hole 26 are joined to the connector support 100. The connector support 100 is supported by other ribs 105 that extend in the direction indicated by the arrow B1. One of the comparatively long ribs 82 that are positioned away from the illumination hole 26 is joined to the wall 102, which is supported by another rib 106 that extends in the direction indicated by the arrow B2.

Figure 5:
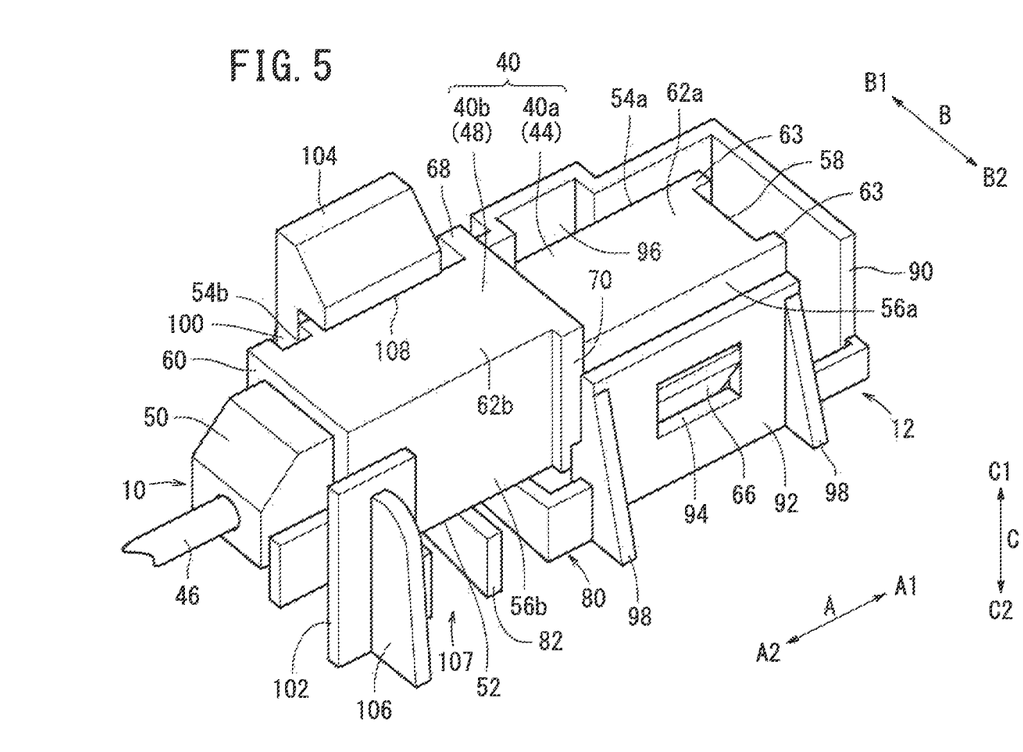
FIG. 5 is a perspective view of the assembly of the attachment structure shown in FIG. 4 and the lighting device installed thereon.
Figure 6:
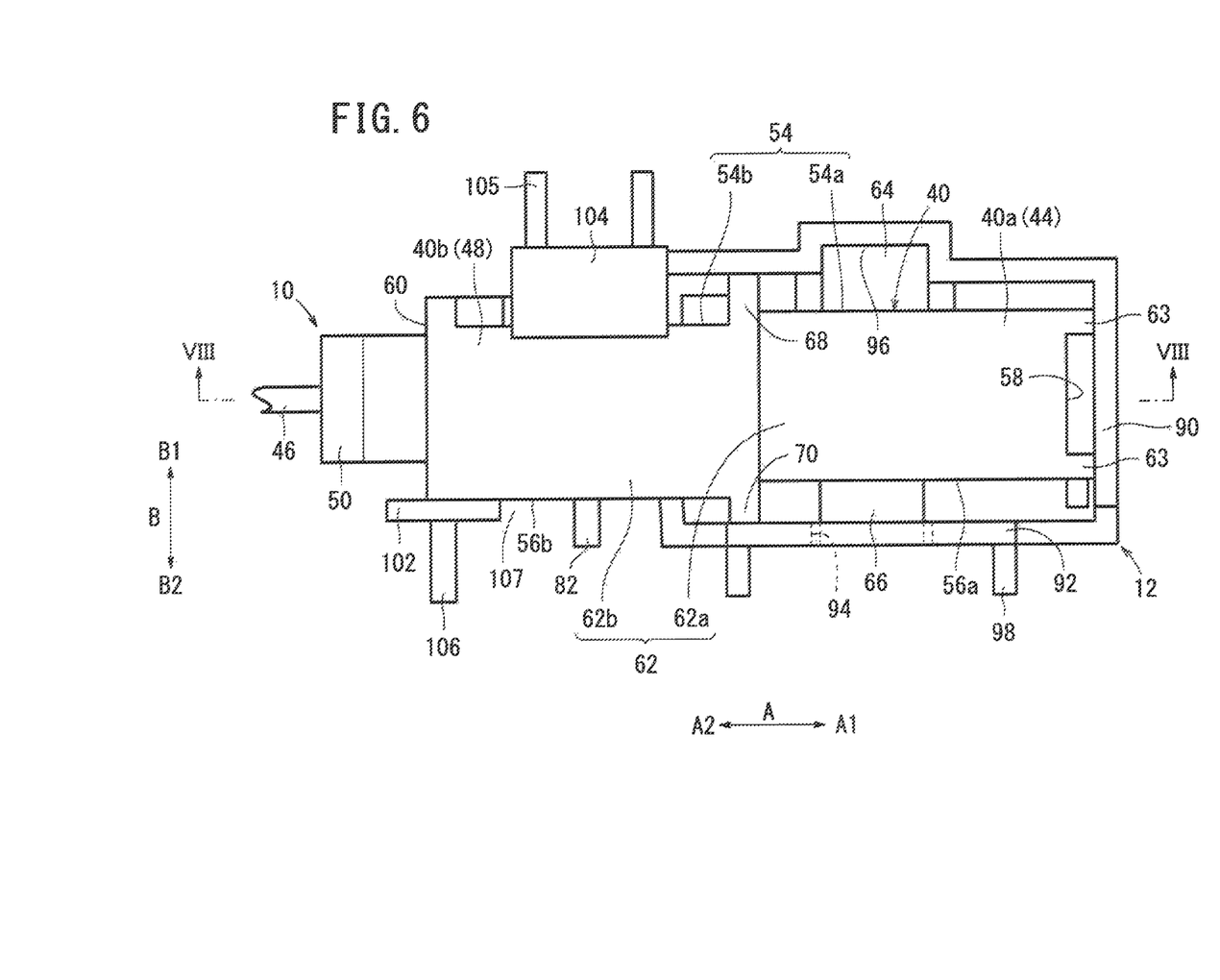
FIG. 6 is a plan view of the assembly shown in FIG. 5.

A region between the light source support 92 and the wall 102 in the attachment structure 12 is defined as an opening 107 that faces the connector support 100 and the hook 104 and that also faces the side surface 56b of the second block 40b. The illumination hole 26, the hole 94, and the opening 107 are disposed in positions that are spaced from each other in order to avoid a reduction in the rigidity of the attachment structure 12. As shown in FIGS. 5 through 7, the light source support 92 and the connector support 100 are disposed in obliquely facing relation to each other. Specifically, the connector support 100 supports the side surface 54b of the second block 40b that makes up part of the side surface 54 of the lighting device 10, and the light source support 92 supports the side surface 56a of the first block 40a that makes up part of the other side surface 56 of the lighting device 10.

A process of installing the lighting device 10 on the upper surface 24 of the door pocket 18 using the attachment structure 12 thus constructed will be described below.

First, the lighting device 10 is lowered along the direction indicated by the arrow C2 while the lighting device 10 is being positioned inwardly of the walls 90, 102, the light source support 92, and the connector support 100 as viewed in plan. The corner of the second block 40b that is provided by the bottom surface 52 and the side surface 54b is brought into abutment against the hook 104.

When the lighting device 10 is further lowered, the connector support 100 and the hook 104 are integrally buckled by the pressing force from the corner about the proximal end of the connector support 100 (the portion of the connector support 100 on the upper surface 24) in the direction indicated by the arrow B1.

Upon further descent of the lighting device 10, the side surface 54a of the first block 40a is brought into contact with the wall 90, and the side surface 58 thereof is also brought into contact with the wall 90 through the ridges 63. Also, the side surface 56a is brought into contact with the light source support 92. The side surface 54b of the second block 40b is brought into contact with the connector support 100, and the side surface 56b thereof is also brought into contact with the wall 102. As a result, the lighting device 10 can slide (descend) in the direction indicated by the arrow C2 along the wall surfaces of the walls 90, 102, the light source support 92, and the connector support 100.

When the bottom surface 52 of the casing 40 contacts the upper ends of the ribs 82, the lighting device 10 is placed on the placement surface of the rest 80, and the light source 42 and the illumination hole 26 face each other. Since the upper surface 62b of the second block 40b is in a lower position than a lower end 108 of the hook 104, the connector support 100 and the hook 104 are released from the pressure from the second block 40b, and snaps back into the original position in which they were before being pressed.

As a result, the hook 104 engages the side surface 54b and the upper surface 62b of the second block 40b, and cooperate with the connector support 100 and the wall 102 in fixing the second block 40b (connector 48) in place. The ledge 66 of the first block 40a engages in the hole 94 of the light source support 92 and the ledge 64 thereof is accommodated in the recess 96 of the wall 90, so that the light source support 92 cooperates with the wall 90 in fixing the first block 40a (light source unit 44) in place.

The first block 40a now has the side surface 54a and the side surface 58 supported by the wall 90 (the latter through the ridges 63), and the side surface 56a supported by the light source support 92. The second block 40*b* has the side surface 54*b* supported by the wall 90 and the connector support 100, the side surface 56*b* supported by the wall 102, and the two bar-shaped ridges 68, 70 supported by the wall 90 and the light source support 92. Consequently, the walls 90, 102, the light source support 92, and the connector support 100 also function as position limiters for limiting displacement of the lighting device 10 in the horizontal directions indicated by the arrow A and the horizontal directions indicated by the arrow B.

When the lighting device 10 is installed on the upper surface 24 by the attachment structure 12, as shown in plan in FIG. 7, a center 110 of the light source 42 (where the illumination light 28 is emitted) and a central axis 112 of the illumination hole 26 along the directions indicated by the arrow A are spaced from each other by a distance d. In other words, the illumination hole 26 is offset from the light source 42 by the distance d in an outward direction of the vehicle, i.e., in the direction indicated by the arrow B2. Therefore, when the light source 42 emits the illumination light 28 into the cavity 22 of the door pocket 18, an area of the cavity 22 which is located more outwardly in the outward direction of the vehicle is mainly illuminated. As a consequence, the illumination light 28 is prevented from being radiated into the space in the passenger compartment outside of the cavity 22.

The illumination hole 26 is of a rectangular shape that is elongate in the directions indicated by the arrow A, i.e., in the longitudinal directions of the vehicle. Therefore, the cavity 22 is illuminated with the illumination light 28 in the longitudinal directions of the vehicle. Even if the light source 42 is positionally displaced in the directions indicated by the arrow A, the illumination light 28 is reliably emitted into the cavity 22.

The lighting device 10 thus installed can be detached from the upper surface 24 and the attachment structure 12 as follows:

The connector support 100 and the hook 104 are buckled in the direction indicated by the arrow B1 about the proximal end of the connector support 100, thereby brining the hook 104 out of engagement with the second block 40*b*. The upper end of the light source support 92 is buckled in the direction indicated by the arrow B2 about the proximal end of the light source support 92, thereby bringing the ledge 66 out of engagement with the hole 94. While the hook 104 and the ledge 66 are being thus disengaged, the lighting device 10 is lifted in the direction indicated by the arrow C1. The lighting device 10 is thus detached from the attachment structure 12.

Figure 9:
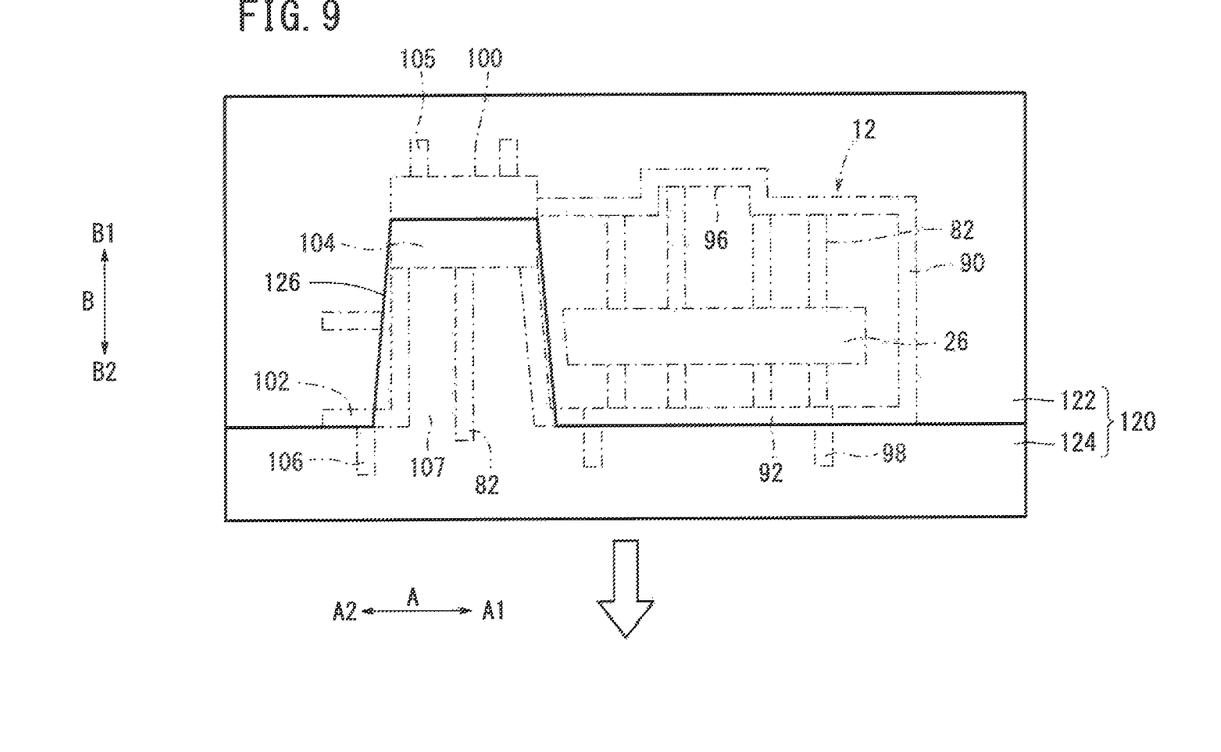
FIG. 9 is a schematic plan view of a die assembly that is used to manufacture the attachment structure shown in FIG. 4.
Figure 10:
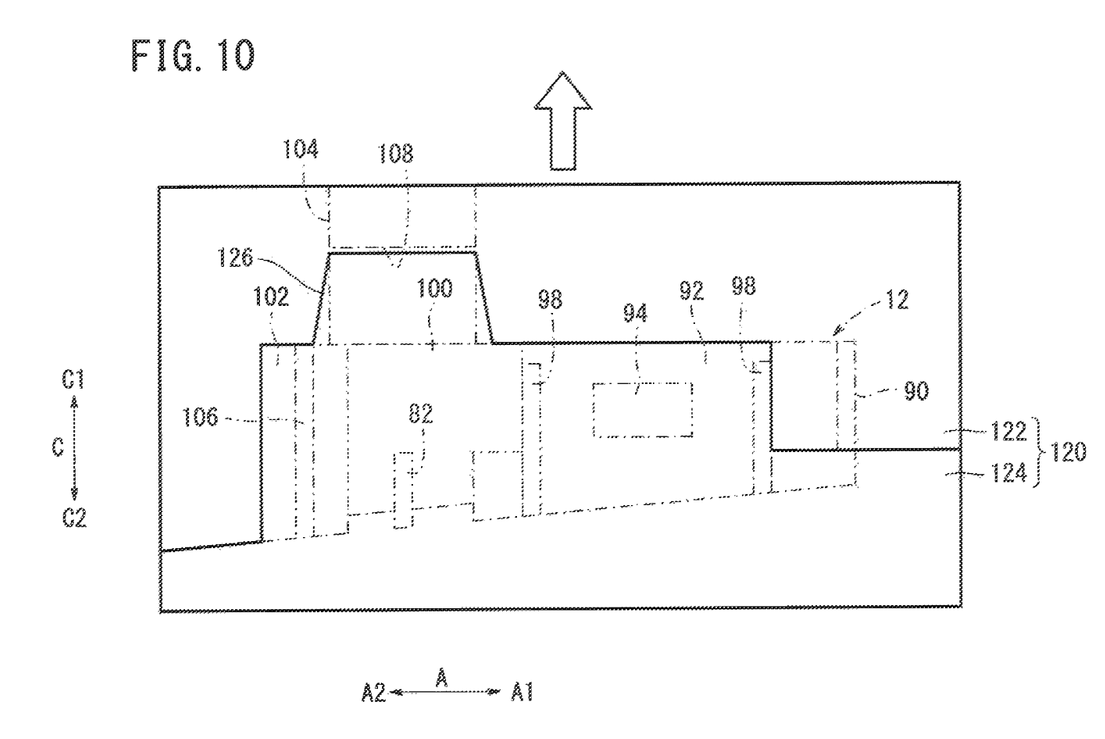
FIG. 10 is a schematic front view of the die assembly shown in FIG. 9.

FIGS. 9 and 10 schematically show the manner in which the attachment structure 12 according to the present embodiment is molded using the die assembly 120.

The die assembly 120 comprises an upper die 122 and a lower die 124.

Since the attachment structure 12 according to the present embodiment is integral with the upper surface 24 of the door pocket 18 as described above, the lower die 124 cannot slide in the direction indicated by the arrow C2 when the attachment structure 12 is molded. As the connector support 100 has the hook 104, there is an undercut in a region below the hook 104, so that the connector support 100 cannot be molded by the upper die 122. Furthermore, the ribs 82, the walls 90, 102, the light source support 92, and the connector support 100 rise from the upper surface 24, and the mounting members as the walls 90, 102, the light source support 92, and the connector support 100 are disposed in surrounding relation to the ribs 82. Consequently, the attachment structure 12 is complex in construction.

According to the present embodiment, as shown in FIGS. 9 and 10, the upper die 122 and the lower die 124 are constructed as follows: FIG. 9 is a schematic plan view of the upper die 122 and the lower die 124 at the height of the undercut referred to above, whereas FIG. 10 is a schematic front view of the upper die 122 and the lower die 124.

The lower die 124 is slidable along the upper surface 24 in the directions indicated by the arrow B.

For molding the attachment structure 12, the lower die 124 is disposed in a position that is spaced from the position where the light source support 92 and the wall 102 are to be molded, in the direction indicated by the arrow B2. As shown in FIG. 9, the lower die 124 has a portion constructed as an extension 126 extending through the opening 107 into the position where the connector support 100 is to be molded. The extension 126 has a height that is set to the height of the lower end 108 of the hook 104. Except for the extension 126, the height of the lower die 124 at the location of the attachment structure 12 is generally set to the heights of the light source support 92 and the wall 102.

The lower die 124 is disposed as shown in FIGS. 9 and 10, and a resin that is molten with heat is poured into the die assembly. Thereafter, the upper die 122 is lowered in the direction indicated by the arrow C2, molding the attachment structure 12 shown in FIGS. 4 through 8. After the attachment structure 12 is molded, the upper die 122 is lifted in the direction indicated by the arrow C1, and the lower die 124 is slid in the direction indicated by the arrow B2.

With the attachment structure 12 for the lighting device 10 according to the present embodiment, when the lighting device 10 is installed on the upper surface 24 of the door pocket 18 of the door lining 14 as an attachment target by the attachment structure 12, the connector 48 is supported by the connector support 100. Therefore, even if vibrations and loads are applied from the wire harness 46 to the connector 48, the connector 48 is stably supported. The lighting device 10 that includes the connector 48 is thus stably supported.

The light source support 92 supports the light source unit 44 and the connector support 100 supports the connector 48, thereby stably supporting the lighting device 10. The light source support 92 supports the side surface 56*a* of the first block 40*a* that corresponds to the light source unit 44, whereas the connector support 100 supports the side surface 54*b* of the second block 40*b* that corresponds to the connector 48. In other words, the two supports support the two side surfaces 54, 56, respectively, of the lighting device 10 in facing relation to each other. As a consequence, the lighting device 10 is easily and stably supported.

According to the present embodiment, since the walls 90, 102, the light source support 92, and the connector support 100 support the side surfaces 54, 56, 58 of the lighting device 10, the lighting device 10 is prevented from being displaced in directions along the upper surface 24 of the door pocket 18, i.e., in the lateral directions thereof (the directions indicated by the arrow A and the directions indicated by the arrow B). As a consequence, the lighting device 10 mounted on the attachment structure 12 is positionally limited and stably supported with ease.

Inasmuch as the wall 90, the light source support 92, and the connector support 100 are integrally formed with each other, these mounting members are of increased rigidity for stably supporting the lighting device 10. Specifically, as the wall 90 and the connector support 100 are joined to each other along the directions indicated by the arrow A, whereas the wall 90 and the light source support 92 are joined to each other along the directions indicated by the arrow A, the mounting members maintain their rigidity and the lighting device 10 is reliably positionally limited.

The hook 104 on the connector support 100 engages the second block 40b, the ledge 66 engages in the hole 94 of the light source support 92, and the ledge 64 engages in the recess 96 of the wall 90, thereby stably supporting the lighting device 10. In other words, since the hook 104 engages the second block 40b which tends to be subjected to vibrations and loads from the wire harness 46, the connector 48 is stably supported with greater rigidity than if the hook 104 engages in a hole. The ledges 64, 66 of the first block 40a which are less liable to be subjected to vibrations and loads from the wire harness 46 engage in the hole 94 and the recess 96, thereby stably supporting the light source unit 44.

Because the hole 94 faces in the direction indicated by the arrow B2 outwardly of the passenger compartment, when the lighting device 10 is to be installed in the door pocket 18 before the door lining 14 is mounted on the door panel, the hole 94 is positioned at a location that can easily be visually recognized by the worker. The worker is thus capable of easily confirming whether the ledge 66 of the first block 40a is engaging in the hole 94 or not.

According to the present embodiment, furthermore, the opening 107 is disposed in facing relation to the connector support 100. When the attachment structure 12 is molded using the die assembly 120, a portion of the attachment structure 12 which is lower than the lower end 108 of the hook 104 is molded by the lower die 124, whereas at least a portion of the attachment structure 12 which is higher than the lower end 108 is molded by the upper die 122. Since the lower die 124 has the extension 126 extending through the opening 107 to the connector support 100, after the attachment structure 12 is molded using the die assembly 120, the lower die 124 is slid in the direction indicated by the arrow B2. Therefore, the lower die 124 can easily be removed. When the upper die 122 is removed in the direction indicated by the arrow C1, the attachment structure 12 molded to desired shape is obtained.

According to the present embodiment, the light source support 92 and the wall 102 are positionally displaced in the directions indicated by the arrow A, thereby defining the opening 107, so that the connector support 100 with the hook 104, and the light source support 92 and the wall 102 do not face each other. Therefore, the upper die 122 and the lower die 124 which jointly make up the die assembly 120 are prevented from being complex and wasteful in structure.

In the above description, the opening 107 is disposed in facing relation to the connector support 100. However, another opening may be provided in facing relation to the light source support 92, and the lower die 124 may have another extension extending through the other opening to the light source support 92. Such a modification offers the same advantages as those described above.

The illumination hole 26, the hole 94, and the opening 107 are positionally displaced from each other, thereby preventing the attachment structure 12 from being reduced in rigidity at one location due to openings.

The illumination hole 26 is defined outwardly from the light unit 44 in the outward direction of the vehicle, i.e., in the direction indicated by the arrow B2 away from the occupants of the vehicle, so that the length of the illumination hole 26 along the directions indicated by the arrow A can be increased in the outward direction of the vehicle away from the occupants of the vehicle.

According to the present embodiment, moreover, the attachment structure 12 and the upper surface 24 of the door pocket 18 of the door lining 14 as an attachment target are integral with each other. Therefore, the process of installing the lighting device 10 on the upper surface 24 is completed by placing the lighting device 10 on the rest 80 of the attachment structure 12 and supporting and fixing the lighting device 10 with the walls 90, 102, the light source support 92, the hole 94, the recess 96, the connector support 100, and the hook 104. As a result, the number of parts used and the number of man-hours for installing the lighting device 10 are reduced compared with the background art, making it possible to install the lighting device 10 on the upper surface 24 with a simpler arrangement. The rigidity of the attachment structure 12 is increased as the attachment structure 12 and the upper surface 24 are integral with each other.

Specifically, according to the present embodiment, compared with the situation where the lighting device 10 is fixed to a member other than the door lining 14 and the other member is fixed to the door lining 14 by screws or the like, the attachment structure 12 is integrally formed with the door pocket 18, and the lighting device 10 is directly installed on the upper surface 24 of the door pocket 18 by the attachment structure 12. Therefore, the installing process is made simple and easy, and the mechanical strength of the attachment structure 12 is increased.

According to the present embodiment, the rest 80 functions as an attachment angle changer for adjusting the attachment angle at which the lighting device 10 is installed on the upper surface 24. By adjusting the attachment angle, it is possible to set the illumination angle of the illumination light 28 output from the lighting device 10 to a desired angle.

The rest 80 also functions as a height adjuster for keeping the placement surface for the lighting device 10 substantially horizontal. The attachment angle can easily be changed by adjusting the height of the rest 80 depending on the state of the upper surface 24. As a result, while the illumination angle of the illumination light 28 output from the lighting device 10 is set to a desired angle, it is possible to install the lighting device 10 on the placement surface of the rest 80 which is kept substantially horizontal.

On the rest 80, the ribs 82 rising from the upper surface 24 function as a height adjuster. As the ribs 82 are integral with the upper surface 24, the number of parts used is reduced, and at the same time the rigidity of the attachment structure 12 is increased.

At least one of the ribs 82 is joined to each of the walls 90, 102, the light source support 92, and the connector support 100 as the mounting members. The rigidity of these mounting members can be increased while the illumination angle of the illumination light 28 output from the lighting device 10 is set to a desired angle.

According to the present embodiment, the ribs 98 joined to the light source support 92 support the light source support 92, the ribs 105 joined to the connector support 100 support the connector support 100, and the rib 106 joined to the wall 102 supports the wall 102. The overall rigidity of the attachment structure 12 is thus increased.

According to the present embodiment, furthermore, the lighting device 10 and the attachment structure 12, and the mounts 32 are staggered in mutually different positions along the directions indicated by the arrow A and disposed on the door lining 14. When the door arm rest 16 is removed from the door lining 14, the lighting device 10 and the attachment structure 12 are prevented from getting in the way.

The present invention is not limited to the above embodiment, but may employ various arrangements without departing from the scope of the invention.

The invention claimed is:

1. An attachment structure for installing a lighting device on an attachment target, the attachment structure comprising:
   a rest that is disposed on a surface of the attachment target and on which the lighting device is placed; and
   a mounting member that is disposed to surround the rest and configured to fix the lighting device placed on the rest,
   wherein
   the attachment structure is formed together with the attachment target,
   the lighting device includes
      a first ledge, and
      a second ledge that is formed on a second side surface across from a first side surface where the first ledge is formed,
   the mounting member includes
      a first wall raising from a surface of the attachment target,
      a second wall raising from the surface of the attachment target to surround the rest together with the first wall,
      a hole that is formed in the first wall to engage the first ledge in a state where the lighting device is placed on the rest, and
      a recess that is formed in the second wall and concave in a direction from the first side surface to the second side surface to accommodate the second ledge in the state where the lighting device is placed on the rest, and
   a part of the second wall is depressed in a direction from the first side surface to the second side surface to form the recess extending from one end to another end of the second wall in a direction in which the second wall raises,
   the lighting device includes
      a light source unit that includes a light source that emits illumination light, and
      a connector that is continuous with the light source unit, and
      the light source unit includes the first ledge,
   the attachment structure further comprises:
      a connector support that attaches the connector to the attachment structure and supports the connector, and
      a light source support that attaches the light source unit to the attachment target and supports the light source unit, and
   the light source support and the connector support face each other in an oblique direction.

2. The attachment structure according to claim 1, wherein the connector support is provided with a hook that engages the lighting device.

3. The attachment structure according to claim 2, wherein a lower end of the hook and an upper surface of the connector engages each other.

4. The attachment structure according to claim 1, wherein the second wall is L-shaped,
   in the state where the lighting device is placed on the rest, out of side surfaces of the lighting device, the first side surface abuts the first wall and the second side surface and a third side surface connecting the first side surface to the second side surface abut the second wall.

5. The attachment structure according to claim 1, wherein an upper end of the connector support is provided with a hook that engages an upper surface and a side surface of the connector that is closer to the connector support.

6. A method for installing a lighting device on an attachment target using an attachment structure, the attachment structure comprising:
   a rest that is disposed on a surface of the attachment target and on which the lighting device is placed; and
   a mounting member that is disposed to surround the rest and configured to fix the lighting device placed on the rest, wherein
   the attachment structure is formed together with the attachment target,
   the lighting device includes
      a first ledge, and
      a second ledge that is formed on a second side surface across from a first side surface where the first ledge is formed,
   the mounting member includes
      a first wall raising from a surface of the attachment target,
      a second wall raising from the surface of the attachment target to surround the rest together with the first wall,
      a hole that is formed in the first wall to engage the first ledge in a state where the lighting device is placed on the rest, and
      a recess that is formed in the second wall and concave in a direction from the first side surface to the second side surface to accommodate the second ledge in the first state where the lighting device is placed on the rest, and
   a part of the second wall is depressed in a direction from the first side surface to the second side surface to form the recess extending from one end to another end of the second wall in a direction in which the second wall raises,
   the lighting device includes
      a light source unit that includes a light source that emits illumination light, and
      a connector that is continuous with the light source unit, and
      the light source unit includes the first ledge,
   the attachment structure further comprises:
      a connector support that attaches the connector to the attachment structure and supports the connector, and
      a light source support that attaches the light source unit to the attachment target and supports the light source unit, and
   the light source support and the connector support face each other in an oblique direction,
   the method comprising, when placing the lightning device on the rest by moving the lightning device in a direction opposite to the direction in which the one or more walls raise while accommodating the second ledge in the recess, engaging the first ledge with the hole to fix the lighting device.

* * * * *